United States Patent [19]

Andrews

[11] 4,100,020
[45] Jul. 11, 1978

[54] INTERNAL FUEL PIN OXIDIZER

[75] Inventor: Mena G. Andrews, Newington, Conn.

[73] Assignee: Combustion Engineering, Inc., Windsor, Conn.

[21] Appl. No.: 734,910

[22] Filed: Oct. 22, 1976

[51] Int. Cl.² ............................................. G21C 3/02
[52] U.S. Cl. .................................. 176/68; 252/181.3; 252/181.6
[58] Field of Search ............ 176/68; 252/181.3, 181.6; 417/48, 49, 51

[56] References Cited

U.S. PATENT DOCUMENTS

| 2,183,302 | 12/1969 | Brauer | 252/181.6 X |
| 3,066,103 | 11/1962 | Owen | 252/181.6 X |
| 3,131,129 | 4/1964 | Morrison | 176/68 |
| 3,168,399 | 2/1965 | Takahashi et al. | 176/68 |
| 3,505,066 | 4/1970 | White | 417/51 X |
| 3,625,821 | 12/1971 | Ricks | 176/68 |
| 3,949,460 | 4/1976 | della Porta et al. | 176/68 X |

OTHER PUBLICATIONS

Hawley, Condensed Chem. Dictionary, Van Norstrand Reinhold Co., N.Y., N.Y., 1971, p. 615.

Primary Examiner—Peter A. Nelson
Attorney, Agent, or Firm—Arthur L. Wade

[57] ABSTRACT

A nuclear fuel pin has positioned within it material which will decompose to release an oxidizing agent which will react with the cladding of the pin and form a protective oxide film on the internal surface of the cladding.

7 Claims, 2 Drawing Figures

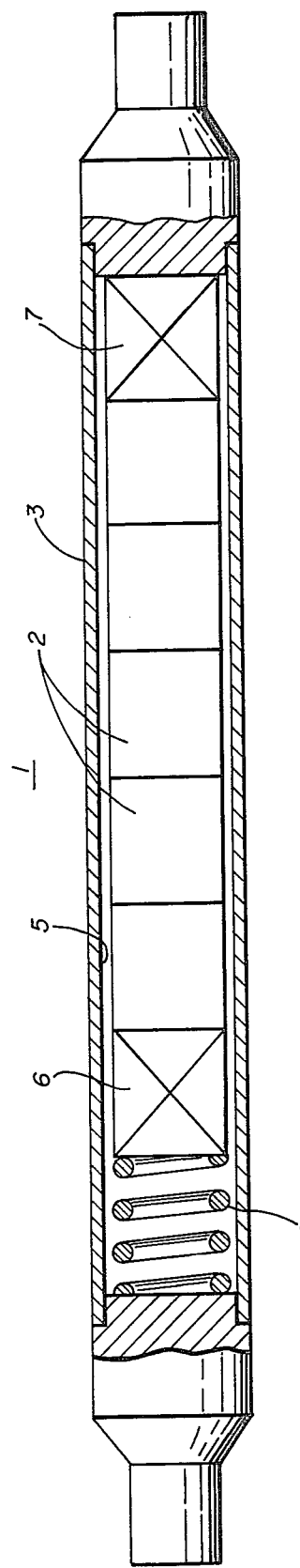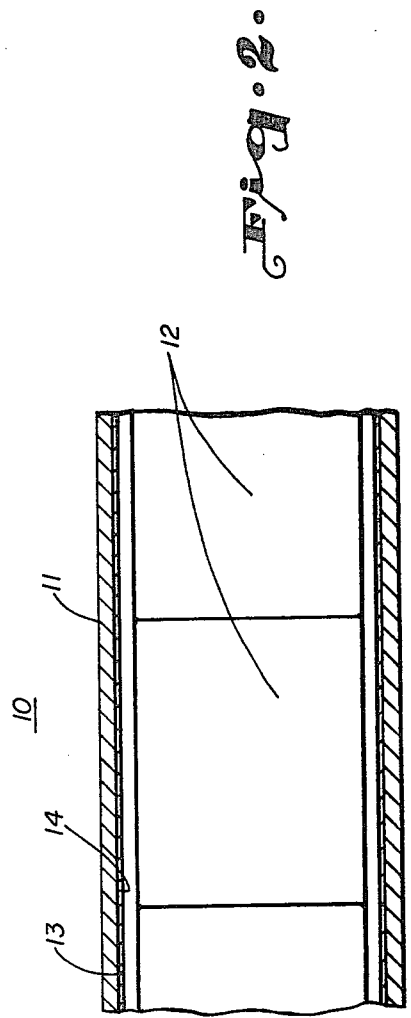

INTERNAL FUEL PIN OXIDIZER

BACKGROUND OF THE INVENTION

1. Field of the Invention

The invention relates to forming protective films on the internal surfaces of a nuclear fuel pin by oxidizing agents. More particularly, the invention relates to renewal of protective films within a nuclear fuel pin by decomposition of material within the pin to provide a source of an oxidizing agent.

2. Description of the Prior Art

Zirconium alloys have been used as clad for nuclear fuel pins which are satisfactory from many standpoints. However, vulnerability of Zircaloy to chemical reaction with iodine, and other elements, inside the fuel pin during operation has limited the performance of the fuel pins. These chemical reactions can produce stress corrosion cracking of the clad and the eventual penetration of the wall of the pin. The result is leaking of the pin. Premature failure of a number of pins in this way can result in a very expensive replacement program and loss of power generation.

If $ZrO_2$ can be formed and maintained on the inside surface of the cladding, the protection by this coating keeps the zirconium alloy relatively immune to chemical attack from within. Unfortunately, the natural environment inside the fuel pin has an oxidizing potential for only a short time. Reactions with the cladding, and other species present, consume the available oxygen during early operation of the fuel pin.

The oxide surface, formed initially, can be broken by mechanical interaction with the fuel pellets or by other means such as chemical breakdown in the absence of sufficient oxygen. The exposed base-metal, zirconium, cannot be filmed over if there is a lack of sufficient oxidizing potential within the pin. Therefore, the base-metal becomes subject to chemical attach by the fission products available through the material processes operating within the pin. Stress corrosion cracking has often been the result of this attack, resulting in failure by perforation of the cladding.

SUMMARY OF THE INVENTION

It is an object of the present invention to provide a continuous supply of oxidizing material within a nuclear material within a nuclear reactor fuel pin throughout the useful life of the pin.

The invention contemplates strategically locating material within a fuel pin during fabrication which will radiolytically and thermally decompose to release oxidizing chemicals, or free oxygen itself. Released within the pin, the oxidizing chemicals, or free oxygen, disperse throughout the pin and are available to form $ZrO_2$, if and when the inside of the pin cladding has its oxide surface broken.

Other objects, advantages, and features of the invention will become apparent to one skilled in the art upon consideration of the written specifications, appended claims and attached drawings.

DRAWING DESCRIPTION

FIG. 1 is a sectioned elevation of a nuclear reactor fuel pin in which the present invention is embodied; and FIG. 2 is an enlarged section of a clad wall of a pin similar to the pin of FIG. 1.

DESCRIPTION OF THE PREFERRED EMBODIMENT

Referring specifically to FIG. 1, a fuel pin 1 is disclosed. The elevation is sectioned to show the arrangement of fuel pellets 2 stacked within clad tube 3.

There is a large body of art developed around the shape, size and composition of fuel pellets 2. Also, the pellets may be spring loaded as indicated with spring 4. It is not the purpose of the present disclosure to do more than indicate the major features of pin structure which will further ready understanding of the invention.

The fuel pellets, as shown, shift position during use and expand due to thermal expansion. Also, mechanical vibration can cause the pellets to move relative to the claddings. With movement and expansion, contact occurs between the cladding and the pellets. This contact can result in abrasion of the inside wall by the pellets. Further, the expanding pellet can apply a stress directly to the cladding.

Abrasion of the tube wall can result in rupture of the protective film 5 of oxide formed on the wall. Without the protective coating 5, iodine and other chemicals can reach the cladding surface and stress corrosion cracking is a probable result. However, the film of oxide can be renewed if a source of oxidizing material is available within the pin.

There are a variety of material available for inclusion within the pin to act as a source of oxidizing chemicals, or free oxygen. One group of such materials is the oxides of the transition metals, nickel, chromium, manganese, iron and cobalt. These transition metals are all capable of existing in at least two different oxidation states and will decompose to a lower oxidation state to yield oxygen at a particular temperature level. For example, nickelic oxide ($Ni_2O_3$) is reduced at about 600° C to yield nickelous oxide (NiO) and oxygen. Likewise, manganese dioxide ($MnO_2$) will decompose to manganic oxide ($Mn_2O_3$) and oxygen at 535° C. The particular oxide and location of the oxide in the pin can be selected for the particular temperature and radiation conditions that exist so that there will be a gradual decomposition and a continuous supply of oxygen within the pin. Any freshly exposed zirconium surface will be rapidly oxidized by these compounds and the resulting oxide, formed on the inside surface of the clad, will protect the clad from attach by iodine and other chemicals.

In FIG. 1 the oxide is disclosed in the form of pellets 6 and 7, placed at each end of the series of the fuel pellets 2. Calculation and experience will readily combine to establish both the form of pellets 6 and 7 and their strategic location in pin 1. In general, the pellets 6 and 7 would be less likely to replace the more important positions for fuel pellets if placed at the ends of a fuel pellets series. The more active pellets are toward the middle of their stack.

FIG. 2 is an enlarged view of a portion of a fuel pin 10 similar to pin 1 of FIG. 1. Clad wall 11 has fuel pellets 12 stacked within it, very similar to the arrangement in FIG. 1. The requirement for a source of oxidizing chemical within pin 10 is comparable to the requirement for pin 1 of FIG. 1.

It is contemplated by the invention that one of the suitable oxidizing chemicals for the required service be formed and mixed with a material such as graphite. In a combination including graphite-like material, the chemical can be applied to the internal surface of clad wall 11 as a coating 13.

Abrasion of the internal surface of clad wall 11 will rupture the coating 13 as well as oxide film 14 underlying coating 13. However, the chemical in the coating is readily available, closely adjacent to the cladding, as a source of oxygen to reform the oxide film 14.

The invention contemplates a wide range of oxidizing chemicals to produce the oxide coating needed to protect the inside wall of a fuel pin. Also, the invention contemplates the oxidizing chemical in different forms and placed at various locations within fuel pin 1. So selected, formed and located, the oxidizing chemical becomes a continual source of oxygen throughout the life of the fuel pin to cure a rupture of the protecting film of oxide on the internal wall of the pin.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A nuclear reactor fuel pin, including,
   a tubular cladding which is sealed,
   a series of fuel pellets aligned along the internal length of the tube,
   and a pellet of oxidizing chemical placed within the series of fuel pellets,
   whereby the pellet of oxidizing chemical will decompose during use of the pin and produce an oxidizing material which will disperse over the length of the tubular cladding and oxidize any internal surface of the tubular cladding which may become exposed.

2. The fuel pin of claim 1, wherein,
   the oxidizing chemical is selected from the group consisting of those oxides of nickel, chromium, manganese, iron and cobalt which are capable of decomposing under operating conditions to yield an oxidizing material.

3. The fuel pin of claim 1, wherein,
   the oxidizing chemical in pellet form is nickelic oxide and the cladding is zirconium.

4. A nuclear reactor fuel pin, including,
   a tubular cladding which is elongated and sealed,
   a series of fuel pellets aligned along the internal length of the tube,
   and an oxidizing chemical in the form of a coating on the internal surface of the cladding,
   whereby the oxidizing chemical of the coating will decompose during use of the pin and produce an oxidizing material which will disperse the length of the tubular cladding and oxidize any internal surface of the tubular cladding which may become exposed.

5. The fuel pin of claim 4, wherein,
   the oxidizing chemical is selected from the group consisting of those oxides of nickel, chromium, manganese, iron and cobalt which are capable of decomposing under operating conditions to yield an oxidizing material.

6. A nuclear reactor fuel pin, including,
   a tubular cladding which has a protective film of oxide formed on the internal wall and which is sealed from the external environment,
   a series of fuel pellets arranged along the internal length of the tubular cladding and having positions from which use will bring about abrasive contact between pellets and the internal wall of the cladding which will rupture the protective film of oxide,
   and an oxidizing chemical positioned within the internal volume of the tubular cladding which decompose during use of the pin into an oxidizing material which disperses throughout the volume and oxidizes any internal surface of the tubular cladding exposed by rupture of the protective film of oxide.

7. The fuel pin of claim 6, wherein,
   the oxidizing chemical is selected from the group consisting of those oxides of nickel, chromium, manganese, iron and cobalt which are capable of decomposing under operating conditions to yield an oxidizing material.

* * * * *